F. W. FARRAR.
Compound Tools.

No. 142,782. Patented September 16, 1873.

Witnesses.
H. L. Perrine
A. H. Norris.

Inventor.
Frank W. Farrar
Per James L. Norris.
Atty.

AM. PHOTO-LITHOGRAPHIC CO. N.Y. (OSBORNE'S PROCESS)

UNITED STATES PATENT OFFICE.

FRANK W. FARRAR, OF WATERFORD, PENNSYLVANIA.

IMPROVEMENT IN COMPOUND TOOLS.

Specification forming part of Letters Patent No. 142,782, dated September 16, 1873; application filed June 12, 1873.

*To all whom it may concern:*

Be it known that I, FRANK W. FARRAR, of Waterford, in the county of Erie and State of Pennsylvania, have invented certain new and useful Improvements in Combined Scissors-Sharpener, Carpet-Rag Looper, and Button-Hole Cutter, of which the following is a specification:

This invention has for its object to furnish to the public a simple and convenient implement, adapted for cutting button-holes of various sizes, for looping carpet-rags, and for sharpening scissors; and to this end the invention consists in the provision of a pointed cutting-blade, which serves as a medium for cutting button-holes, and, in connection with an eye or opening through the same, as a carpet-rag looper, while a transverse strip, with reversely-beveled edges applied to the lower end of the cutting-blade, acts as a sharpener for scissors and similar articles of cutlery, the device being also provided with a screw-threaded shank, to enable it to be attached to a suitable base or support, or to be removed therefrom when desired.

Figure 1:
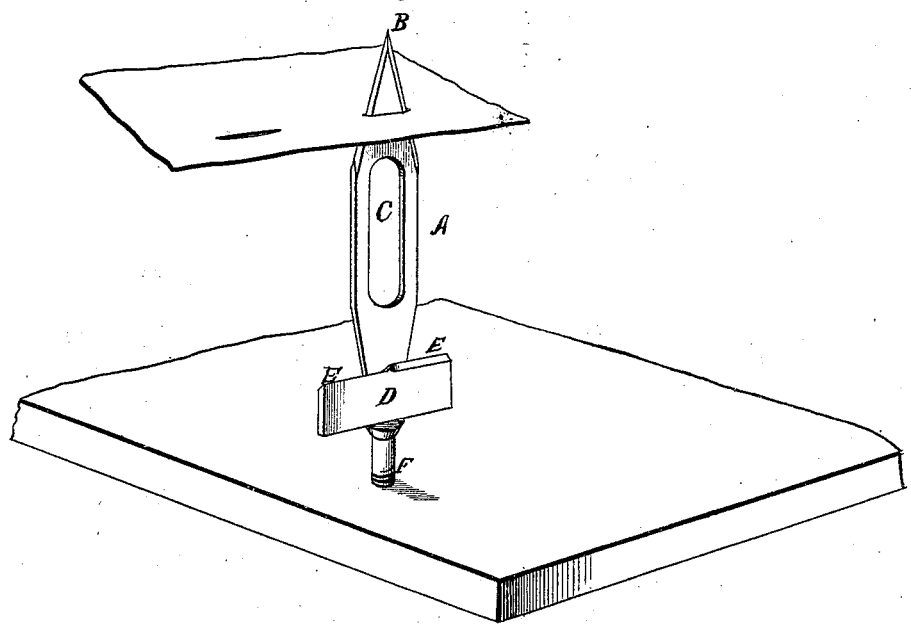
Figure 2:
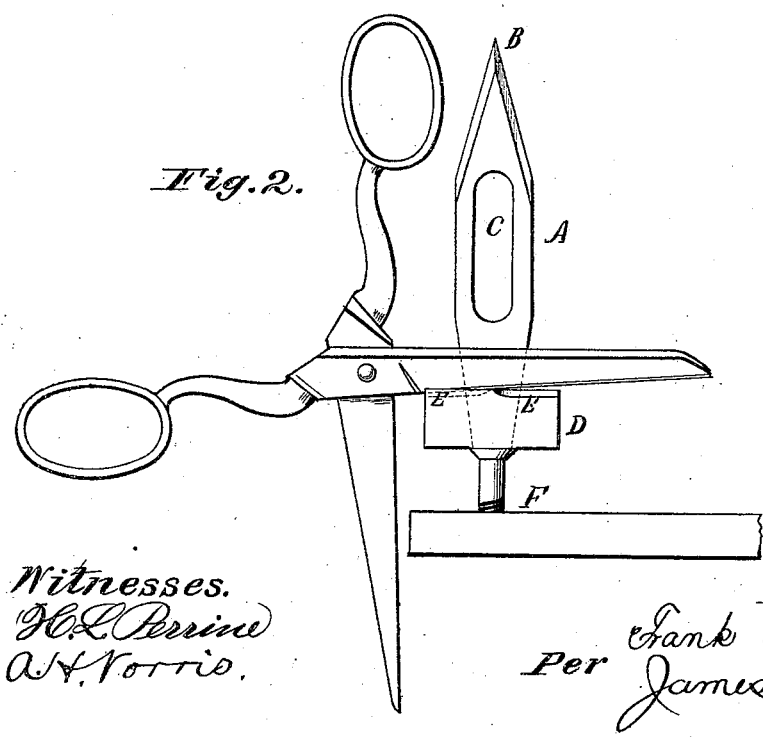

In the accompanying drawings, Figure 1 represents the implement when employed for cutting button-holes, and Fig. 2 represents the device employed for sharpening scissors.

A represents the plate or body of my device provided with a point, B, which possesses lateral cutting-edges, so that when inserted through cloth or carpet-rags it will readily penetrate the same. An eye or opening, C, of an oblong or other suitable shape, is formed in the plate A, for use in the operation of looping carpet-rags in the manner hereinafter described. To the lower end of the plate A is attached a horizontal strip, D, which is provided with reversely-beveled upper edges E, so that scissors or shears, drawn across the same, may be sharpened with facility and ease on both sides, in whatsoever position the implement may be held. F designates a screw-threaded shank or prolongation of the plate A, which is designed to be screwed into a suitable base-board or support, when the implement is used as a carpet-looper, in such a manner as to permit the same to be readily removed by hand, when desired for any of the other purposes stated. The operation of cutting button-holes is performed by inserting the pointed plate A through the fabric, and the size of the hole is determined by causing the implement to penetrate to a greater or less degree, as will be obvious. When the device is used as a button-hole cutter or scissors-sharpener, it is more convenient not to attach it to a support, as it may then be held in the hand; but this is left to the discretion or will of the operator. In the operation of looping carpet-rags, the two ends of the rags are overlapped, then the implement is forced through the same, and the end of the lower rag passes through the eye C. This accomplished, the rags are detached with the left hand from the looper, when the end of the lower rag is drawn with the right hand through the opening of the loop, which finishes the operation.

From the above statement, it will be perceived that an implement possessing the characteristics or elements specified, while capable of being used for looping carpet-rags, cutting button-holes, and for sharpening cutlery, does not increase the size or shape of the same, which is a desideratum in devices of this description.

Having thus fully described my invention, what I claim as new, and desire to secure by Letters Patent, is—

A compound tool, consisting of a scissors-sharpener, button-hole cutter, and carpet-rag looper, constructed and operating in the manner herein described and shown.

In testimony that I claim the foregoing I have hereunto set my hand this 3d day of June, 1873.

FRANK W. FARRAR.

Witnesses:
C. W. S. ANDERSON,
S. R. BRYANT.